United States Patent
Vilcauskas et al.

(10) Patent No.: US 7,370,063 B2
(45) Date of Patent: May 6, 2008

(54) AUDIO DISTRIBUTION SYSTEM

(76) Inventors: Andy Vilcauskas, 7305 SW. Delaware Cir., Tualatin, OR (US) 97062; Bryan Hunter, 17580 SE. Paradise Dr., Portland, OR (US) 97267

( * ) Notice: Subject to any disclaimer, the term of this patent is extended or adjusted under 35 U.S.C. 154(b) by 0 days.

(21) Appl. No.: 11/355,380

(22) Filed: Feb. 15, 2006

(65) Prior Publication Data

US 2007/0011095 A1 Jan. 11, 2007

Related U.S. Application Data

(60) Provisional application No. 60/759,145, filed on Jan. 13, 2006, provisional application No. 60/738,858, filed on Nov. 21, 2005, provisional application No. 60/653,965, filed on Feb. 17, 2005.

(51) Int. Cl.
*G06F 17/30* (2006.01)
*G06F 17/00* (2006.01)
(52) U.S. Cl. .................................. 707/104.1; 707/1
(58) Field of Classification Search .................. 707/1, 707/104.1
See application file for complete search history.

(56) References Cited

U.S. PATENT DOCUMENTS

2006/0008256 A1* 1/2006 Khedouri et al. ............ 386/124

* cited by examiner

*Primary Examiner*—Tony Mahmoudi
(74) *Attorney, Agent, or Firm*—Chernoff, Vilhauer, McClung & Stenzel

(57) ABSTRACT

Audio, including content of a digital data stream, is distributed by a system that confirms an ownership interest in the audio content before an audio file is transferred.

9 Claims, 13 Drawing Sheets

| EXCHANGE LIMITATIONS | |
|---|---|
| 150 | TIME |
| 152 | COST OF INSTANCE OF OWNERSHIP COMPARED TO SELECTED ONE |
| 154 | SIGN UP FEE PAID BY USER |
| 156 | TYPE OF MEDIA |
| 158 | GENRE |
| 160 | USER PREFERENCES |
| 162 | LENGTH OF AUDIO RECORDING |
| 163 | LOCATION OF USER |

AUDIO DISTRIBUTION SYSTEM

CROSS-REFERENCE TO RELATED APPLICATIONS

This application claims the benefit of U.S. Provisional Application No. 60/653,965 filed Feb. 17, 2005, U.S. Provisional Application No. 60/738,858 filed Nov. 21, 2005, and U.S. Provisional Application No. 60/759,145, filed Jan. 13, 2006.

STATEMENT REGARDING FEDERALLY SPONSORED RESEARCH OR DEVELOPMENT

Not applicable.

BACKGROUND OF THE INVENTION

The present invention relates to a system for distributing audio compositions, such as music.

The traditional technique for selecting music involves listening to the radio, remembering which artists and songs are most appealing to the listener and then purchasing a compact disc, tape, or album containing the desired music at a music store. Unfortunately, a compact disk frequently contains numerous songs that the listener does not like and it may be very difficult to locate a recording of a specific musical or other audio performance. Accordingly, the listener often obtains a compact disk with one, and possibly two, songs which are enjoyable. On the other hand, when a favorite artist releases a new compact disc, the listener may purchase the compact disc without listening to the songs but with the expectation that the music will be enjoyable. Unfortunately, the compact disk will occasionally be completely devoid of any enjoyable songs. After obtaining a compact disc that is no longer wanted, the user typically sells the compact disk on the secondary market at a substantial discount.

To increase sales and to partially alleviate the unknown quality of the songs included on a compact disk, Internet-based music retailers selling compact disks may provide samples of selected songs for previewing. This permits the potential customer to make a more informed decision regarding whether to purchase a particular compact disk by listening to at least some of the songs included on the compact disk prior to purchasing it. While this is an improvement, the samples of the songs may be misleading as to the nature of the complete song. In addition, samples may not be provided for many of the songs on a particular compact disk and often samples are not provided for any of the music included on a compact disk. Once the customer has purchased a compact disk, the customer may need to wait several days for it to arrive. If the purchaser does not like the compact disk after purchasing it, the purchaser may relegate the compact disk to a drawer or sell the disk on the secondary market at a substantial discount.

Other online retailers provide individual compressed digital audio music files for downloading and purchase by customers. While permitting the customer to download desirable songs, without purchasing the entire album, the purchaser is neither able to return the digital audio file for a refund of the purchase price nor able to lawfully transfer the digital audio file to others.

Peer-to-peer music sharing over the Internet is another method of acquiring music. With an audio "ripping" program, a user samples the "uncompressed" music on a compact disk and then compresses the resulting audio data to create a compressed audio file, such as a Motion Picture Experts Group, Audio Layer 3 file, commonly referred to as an MP3 file. The compressed file is typically stored on the hard drive of the user's computer. Upon signing onto the peer-to-peer music sharing service, the compressed audio files on all of the hard drives of all of the service's users are made available to all other users and a user may listen to different music by downloading songs available from other users. This provides a convenient technique for sampling different music that the listener may not have otherwise listened to. Unfortunately, the music downloaded through a peer-to-peer music service is often compressed at different sampling rates, resulting in music having uneven audio qualities. In addition, re-compressing the compressed audio at another sampling rate produces a lower quality recording than would been produced if the uncompressed audio had been sampled at the desired final sampling rate. Because the system is a peer-to-peer file transfer system, with the server merely providing the network address of the audio files, the actual quality of the compressed audio is unknown and frequently the compressed audio files do not include the entire song. The user may likewise be unable to locate a desired song because it is currently unavailable from other users. Further, the download speeds are limited by the data transfer rate of the network connection between users and it frequently takes substantial time to download the desired audio files. Moreover, peer-to-peer audio file servers may require suitable licenses to comply with the current United States copyright laws.

In United States Patent Application Publication, Pub. No.: US 2002/0152874 A1, incorporated herein by reference, the present inventors disclosed an audio ownership system comprising a server storing audio files and connected to transfer the stored audio files to remote users. When contacted by a user seeking to acquire an audio file, the server determines whether the service provider owns a copy of a compact disk or other medium on which the audio file is recorded. If the service provider has an ownership interest in the audio file by virtue of ownership of a corresponding compact disk or other medium, the copy of the compact disk or other medium is "locked out" against downloading by others and the audio file is downloaded by the user. However, downloading is not permitted if all of the copies of the compact disk or other medium owned by the service provider are locked out as a result of previous or concurrent downloading. While the system facilitates locating music that is desired by users, provides high quality audio downloads and compensates suppliers of audio content, it may be difficult to locate a compact disk or other media that includes a particular performance of interest to a user and maintaining an inventory of compact disks comprising a number of performances of the same music can be expensive.

Acquiring music by previewing songs on the radio or otherwise and then locating a source of a compact disk or a high quality music file containing the desired song is often a time consuming process that results in listener dissatisfaction. What is desired, therefore, is a convenient system enabling listeners to preview, select, and acquire desired, high quality audio.

DETAILED DESCRIPTION OF THE INVENTION

After considering the limitations of the available alternatives for previewing, selecting and acquiring music and other audio content, the present inventors came to the realization that a different paradigm for audio distribution should be developed. While the distribution system should be based upon ownership of rights in the music or other audio content so that all the artists are properly compensated for their work, providing audio files with ownership rights in selected songs would typically require selling a compact disk or other media containing a recording of the songs or other audio content. After listening to the compact disk, the user may exercise the ownership rights by reselling the compact disk albeit, typically, at a discount. However, delivering a compact disk to a purchaser or a subsequent purchaser of a used disk commonly utilizes a postal or other delivery service which is expensive and time consuming. Similarly, it is time consuming to travel to a music store to purchase a compact disc and thereafter travel to a used music store to sell the compact disc, typically for less than one-half of the purchase price. Moreover, identifying a compact disk or other medium that includes desired music by previewing the music on the radio or in a catalog of samples can be time consuming and frustrating. Further, it may be extremely difficult to locate a compact disk or other medium containing a recording of a particular performance that may have been, for example, included in a radio or television broadcast.

A server-based distribution system provides a better opportunity to properly compensate artists and other content creators and enables better control of the quality of the audio files and the distribution services than can be provided by peer-to-peer connections. Combined with digital audio transmission and recording technology, a server based audio distribution system can facilitate a purchaser's quick location and easy acquisition of desired audio content.

Figure 1:
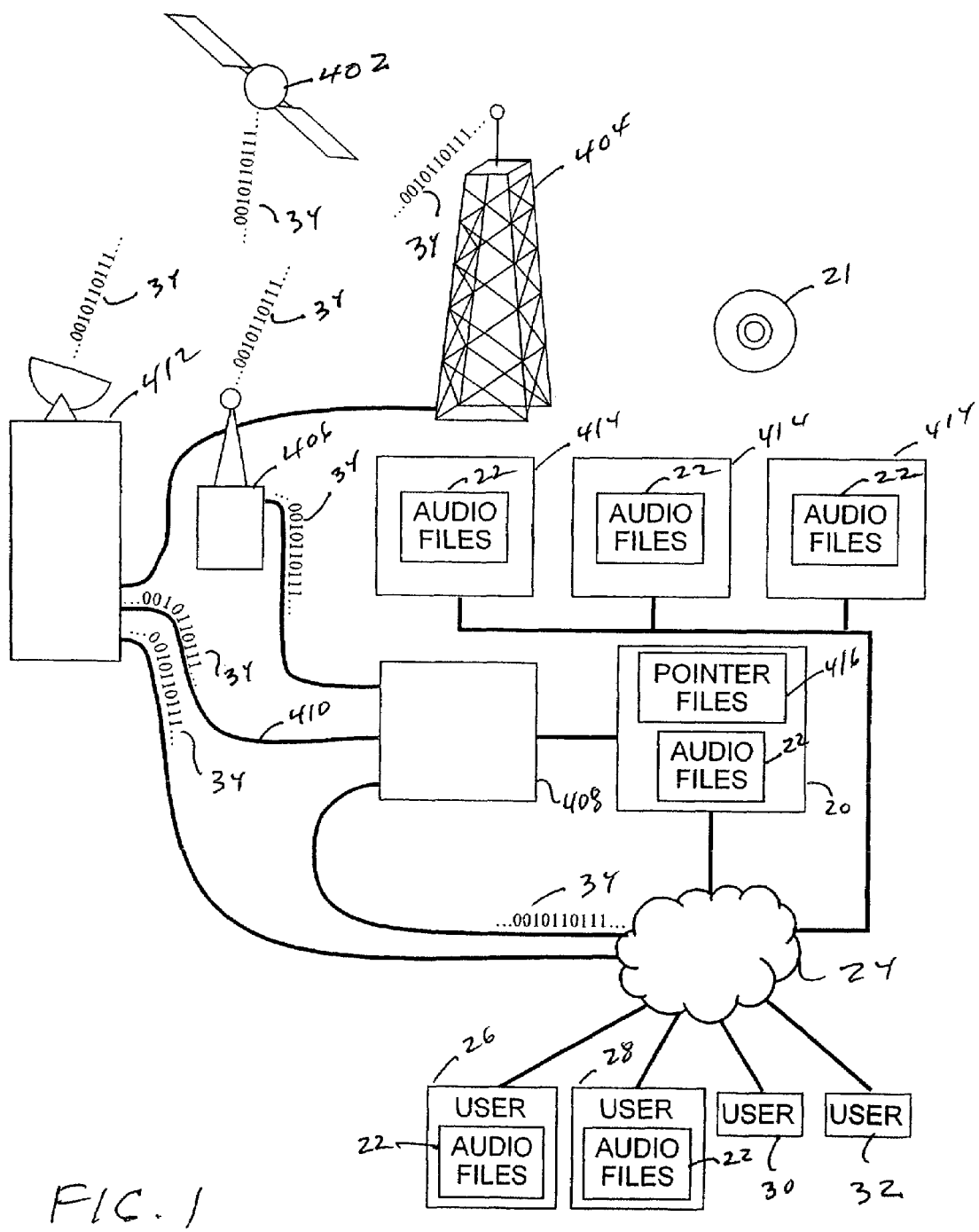
FIG. 1 is a pictorial diagram of a network-based audio file system.

Referring to FIG. 1, a server 20 stores or otherwise has access to audio files 22 and is interconnected to the Internet 24. It is to be understood that the Internet may be any type of computer network which permits communication between multiple computing devices, such as computers (for example, the server 20); personal digital assistants (PDAs); portable music players; set top boxes, a specialized computing device typically including one or more microprocessors and software for running an operating system, parsing a digital television transport stream or other data stream and facilities for communicating over the Internet 24 or another computer network; and mobile telephones. Communication between the server 20 and multiple user computing devices or users 26, 28, 30, and 32 may be facilitated by interconnection with the Internet 24.

The audio files 22 may be obtained from a number of sources, including a compact disk, record, tape or other storage medium 21. In addition, audio files 22 may be obtained by sampling analog audio signals. Audio files 22 may also be obtained by electronic file transfer from a file source or by capturing a digital data stream 34. The digital data streams 34 may comprise; by way of examples, digital radio, television, Internet and other digital transmissions. The transmissions may be over-the-air transmissions from a satellite 402 or terrestrial radio or television transmitter 404 and received by a digital radio or television receiver 406 that is in communication with a recorder 408. The recorder 408 is preferably a digital recorder utilizing electronic, magnetic, light or other storage mechanism to store a digital data stream but may include an analog device, such as a VHS recorder. On the other hand, the digital data stream may comprise a unicast, multicast or broadcast transmission delivered by cable 410 or the Internet 24 from a television or radio broadcaster or other audio source 412. While an audio file 22 captured by recording a digital data stream 34 may comprise a complete performance, album, or television or radio program, the recorder 408 typically has the capability of recognizing individual songs or other units of content included in the data stream and saving and identifying the individual songs and/or performances as separate audio files 22. For example, the recorder 408 may read a flag included in the data stream that identifies the title, artist and other information related to a song or other composition included in the data stream. The recorder 408 communicates the information identifying the content of the data stream 34 to the server 20 enabling cataloging of the contents of the data stream so that users can conveniently search the catalog and identify specific compositions or other units of audio content of interest. The recorder 408 also enables time shifting of data streams, such as radio and television transmissions, so that the stream content can be listened to at a time that is convenient to the user 26, 28, 30, 32.

To reduce the storage and transmission requirements, the audio files 22 are preferably compressed. Digital audio files may be acquired from a source in a compressed format or, if obtained from a compact disk, are typically compressed to a size smaller than the corresponding file included on the compact disk. The size of an audio file produced by sampling an analog music signal can be controlled by varying the sampling rate or by compressing the digital audio file that is produced by sampling the analog signal. On the other hand, digital audio included in captured data streams may be decompressed, reformatted and re-compressed before storage. For example, over-the-air digital broadcasts may be reformatted and stored as MP3 files.

While the audio files 22 may be physically present on the server 20, it is also understood the audio files 22 may be stored on one or more remote computing and storage devices 414, including a user's computing device 26, for example a set top box or a digital video or audio recorder, which is communicatively connectable to the server 20. An audio file 22 may contain a complete composition; such as a song, an album, or a performance, or may contain only part of a complete composition or a portion of a digital data stream while another part of the composition, data stream or other audio unit is included in another audio file stored on the same or another computing device. Audio units may be downloaded to users 26, 28, 30, 32 by copying or streaming the data contained in the appropriate audio files 22 from the server or other storage location. On the other hand, the data making up the audio unit may be distributed in several audio files containing portions of the audio content, including audio files stored on a user computing device 26, 28. The server 20 or another server may track the locations and identities of the audio files 22 comprising an audio unit. When a user 30 requests an audio file, the server 20 may provide a file of pointers identifying the filenames, locations and other relevant information concerning the audio files 22 making up the audio unit so that the audio files can uploaded from multiple sources to speed up delivery of the desired audio content. Audio files 22 may be downloaded as parts of a unicast, multicast, or broadcast transmission.

The system provider (e.g., an entity that provides the audio files to a user) has obtained, by license, purchase or otherwise, rights in the nature of ownership to each audio unit available to a user. An audio unit comprises an audio composition, such as a song, an album, or a performance comprising one or more of the audio files 22 available from the server or producible from a stored audio file that may be downloaded or otherwise transferred to the users 26, 28, 30, 32 from the server 20. By way of example, the provider may have acquired rights in the nature of ownership to a song as a marketable audio unit by purchasing or otherwise licensing the right to distribute a copy of the song as a single or by purchasing a compact disk or other medium containing the song. On the other hand, by purchasing a compact disk or other medium that includes an album comprising the song or by obtaining a license to distribute the album, the provider may distribute a copy of the song as part of an audio unit comprising the album. In the alternative, the provider may have the right to distribute copies of each of the individual songs included on the album, up to the number of albums in which the provider has an ownership interest. By way of additional examples, a song included in a performance captured from a broadcast data stream may be distributed as a component of an audio unit comprising the performance or as a single, if the provider has obtained a license to distribute the copies of the performance or, in the alternative, to distribute the component songs of the performance. In essence, the provider has purchased or otherwise acquired an instance of ownership to each copy of the audio content, stored in one or more audio files 22 or producible from an audio file, which may be downloaded or streamed as an audio unit from the server 20. Preferably, the ownership interest is an interest sufficient to transfer an identical ownership interest to others by a gift, sale, transfer, or otherwise and is preferably not in the nature of a rental, a lease, lending, or by any other act or practice in the nature of rental, lease, or lending. Further, it is preferable that the ownership interest be sufficient to permit the audio files to be free from encryption that limits their use, geographical or otherwise; copyright water marking; proprietary formats for a particular system; a file encryption that inhibits copying of the file; a file encryption that inhibits or otherwise limits the number of copies that may be made; time limited durations, etc. In this manner, the audio files are freely transferable from one system to another and an effective transfer of ownership by sale, or otherwise, of the content is accomplished.

Figure 2:
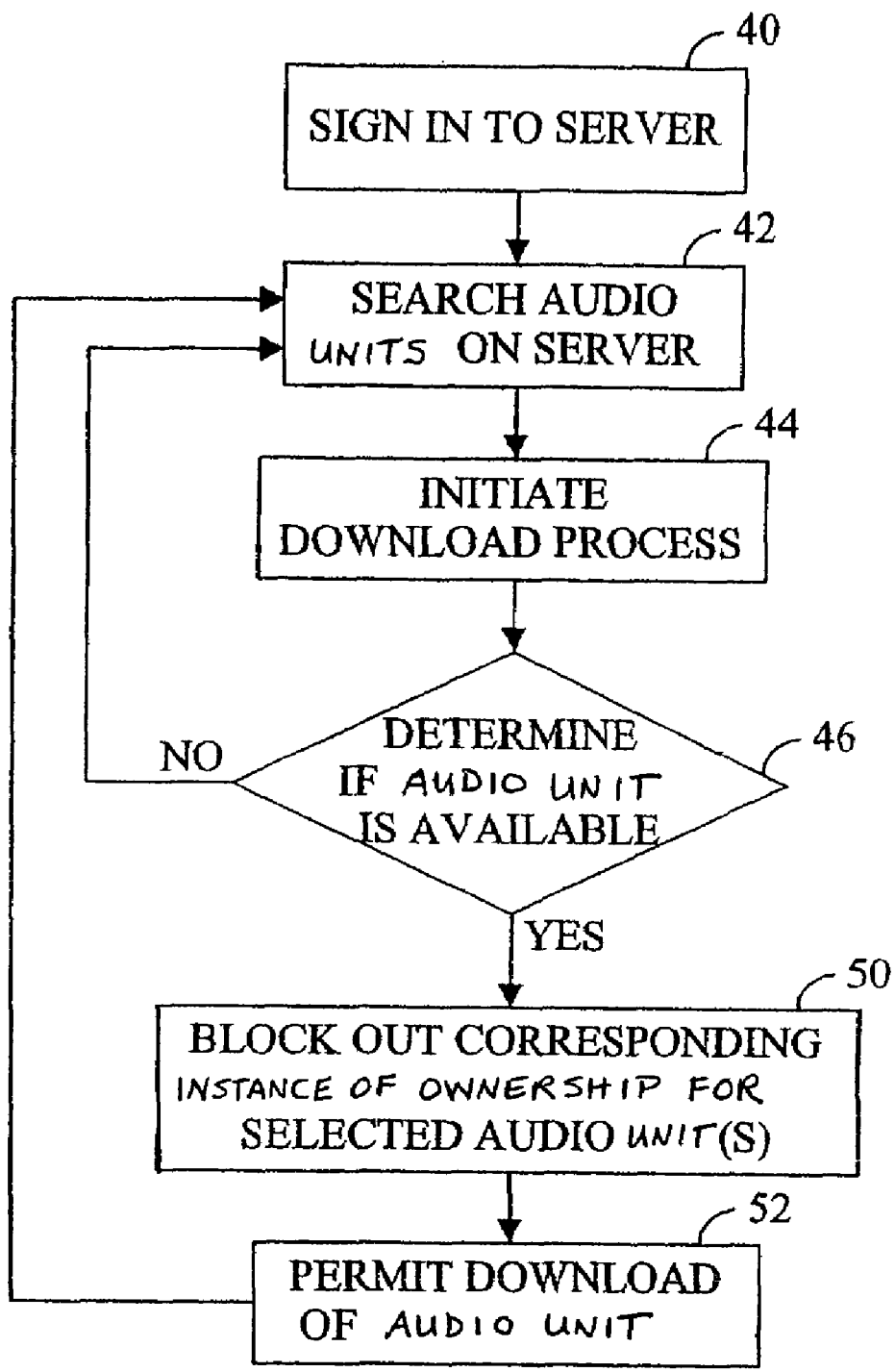
FIG. 2 is a block diagram of one embodiment of an audio file system.

Referring also to FIG. 2, the user may initially sign into the server 20 to listen to, identify, and download desirable audio files 22 at block 40. The user may search the audio files 22 on the server 20 at block 42 by any suitable technique, such as for example, artist, name of album, name of song, name of composer, name of producer, genre, etc. After locating a suitable song(s), album, or other audio unit the user may initiate the downloading or listening process at block 44 for the desired audio file(s) 22 from the server 20. Initially the server 20 determines if that audio unit is currently downloaded or in use by another user at block 46. If the audio unit is currently downloaded, in use, or being downloaded by the same or another user, then the system determines if a sufficient number of instances of ownership; for examples, copies of media containing the audio unit or instances of licenses for the audio unit, are owned by the provider to permit another download. In this manner, for each copy of an audio unit a corresponding instance of ownership; a compact disk or other medium, instance of a license, or other establishment of ownership rights, is verified as being owned by the provider. The audio unit is determined to be available or not available at block 46. If the audio unit is determined to be available at block 46, the corresponding instance of ownership is "locked out" or otherwise made unavailable to other users at block 50, for as long as a copy of the audio unit is downloaded to a particular user. If no further ownership rights to the audio unit are available, the audio unit is made unavailable to other users. In this manner, the owners of any copyrights in the content of the audio unit are compensated for their contribution because only one copy, albeit compressed, of that content which was obtained by the provider is provided to any user at any particular time. If a copy of the audio unit has not been downloaded, not being downloaded by others, and/or the service provider otherwise has a instance of ownership to another copy of (or the only copy of) the content of the audio unit, then the user is permitted to download a copy of the content at block 52. Upon downloading the audio and/or otherwise selecting content to be downloaded or streamed, the corresponding instance of ownership is indicated as "unavailable." In this manner, audio content is made available to users in a convenient manner where quality may be maintained. The provider may "rip" or otherwise obtain the digital audio files 22 with a desired sampling rate where the completeness of the audio files are guaranteed. The provider may maintain physical control over any medium 21 and may or may not provide a physical medium 21 to the user, if desired.

Figure 3:
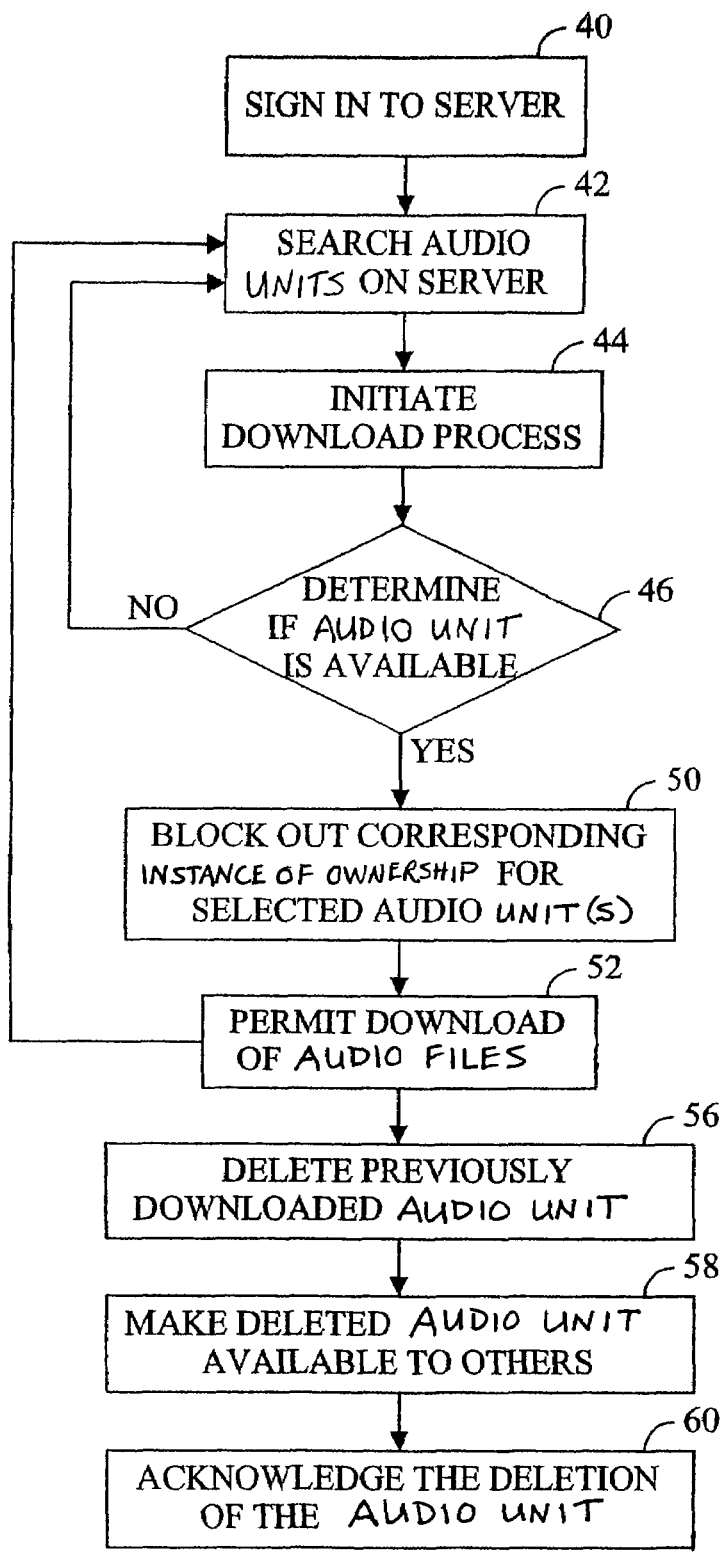
FIG. 3 is a block diagram of another embodiment of an audio file system.

Referring to FIG. 3, (a further embodiment) after the user has completed downloading the desired song or other audio unit; the user may desire to search for other songs on different albums or from other performances. Prior to downloading or streaming a song or other content from a different album or other audio unit, the user may delete, if desired, the copy of files comprising a previously downloaded audio unit at block 56. Upon deleting the previously downloaded files, the corresponding instance of ownership that was "locked out" is then made available to other users at block 58. After deleting the previously downloaded audio files, and preferably acknowledging the deletion of the audio files at block 60, the user may start downloading or streaming additional audio files from a different audio unit. In this manner, digital copies of audio may be provided to a user without violation of the copyright owner's interest in the content because only a single copy of a particular song or album, for which a legitimate ownership interest has been obtained, is downloaded, streamed or otherwise transferred, at any particular time, albeit preferably in a compressed digital form. In the event that there is sufficient bandwidth, the audio files 22 do not need to be compressed.

Figure 4:
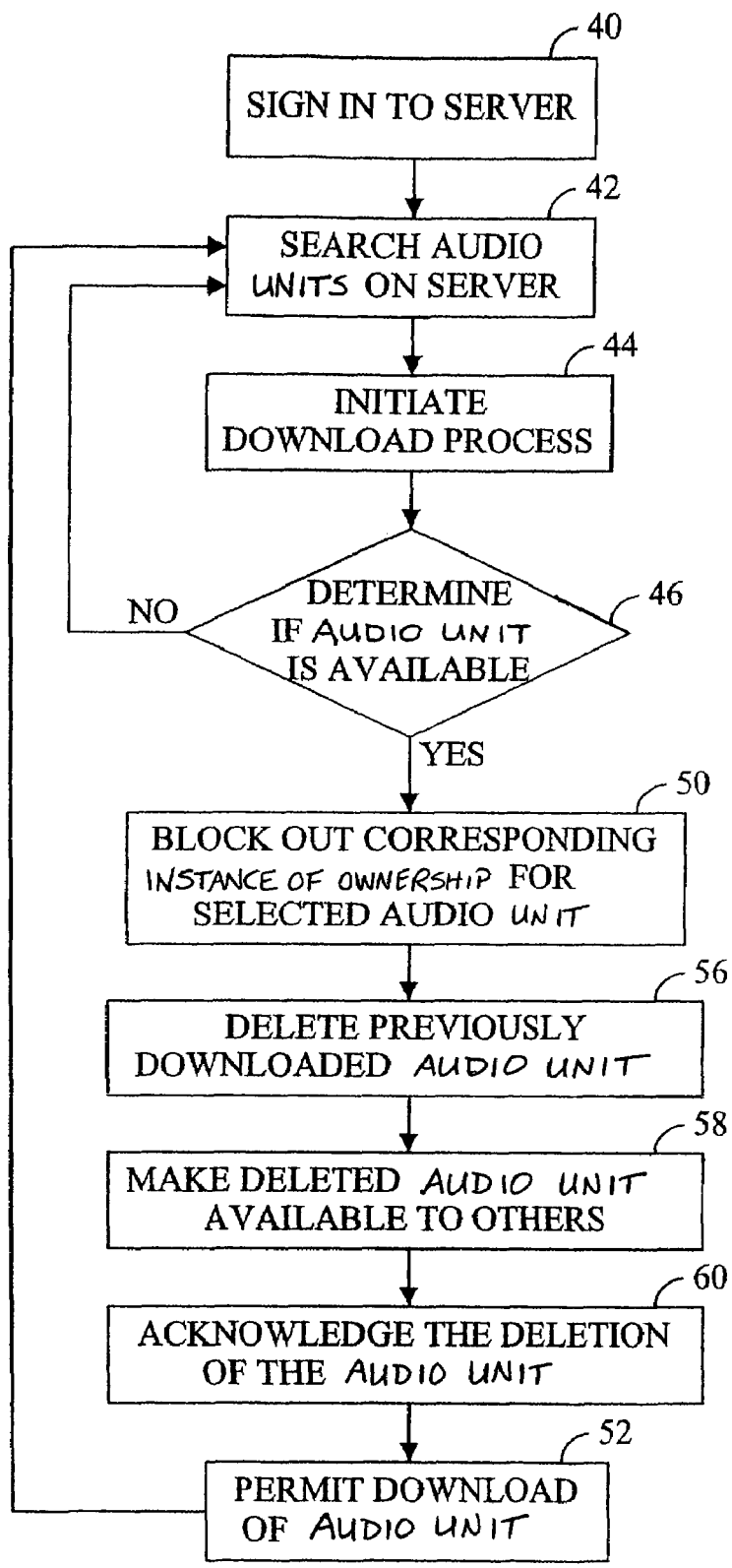
FIG. 4 is a block diagram of another embodiment of an audio file system.

After consideration of the process by which the audio files 22 are made available to the user, the present inventors realized that rearranging the order of the processes may result in a decrease in the number of instances of ownership that need to be obtained. Referring again to FIG. 3, if a corresponding instance of ownership is locked out at block 50 and downloading of an audio unit is permitted at block 52, there exists the possibility that considerable time may elapse before the user actually acknowledges the deletion of the previously downloaded audio files at block 56. Referring to FIG. 4, it is preferable that the deletion at block 56, the acknowledgment at block 60 (if provided), and the making available of the audio unit at block 58 are performed prior to permitting downloading of the newly selected audio files at block 52. In this manner there is a reduced likelihood of multiple audio files from different audio units being "locked out" for a significant period of time.

Figure 5:
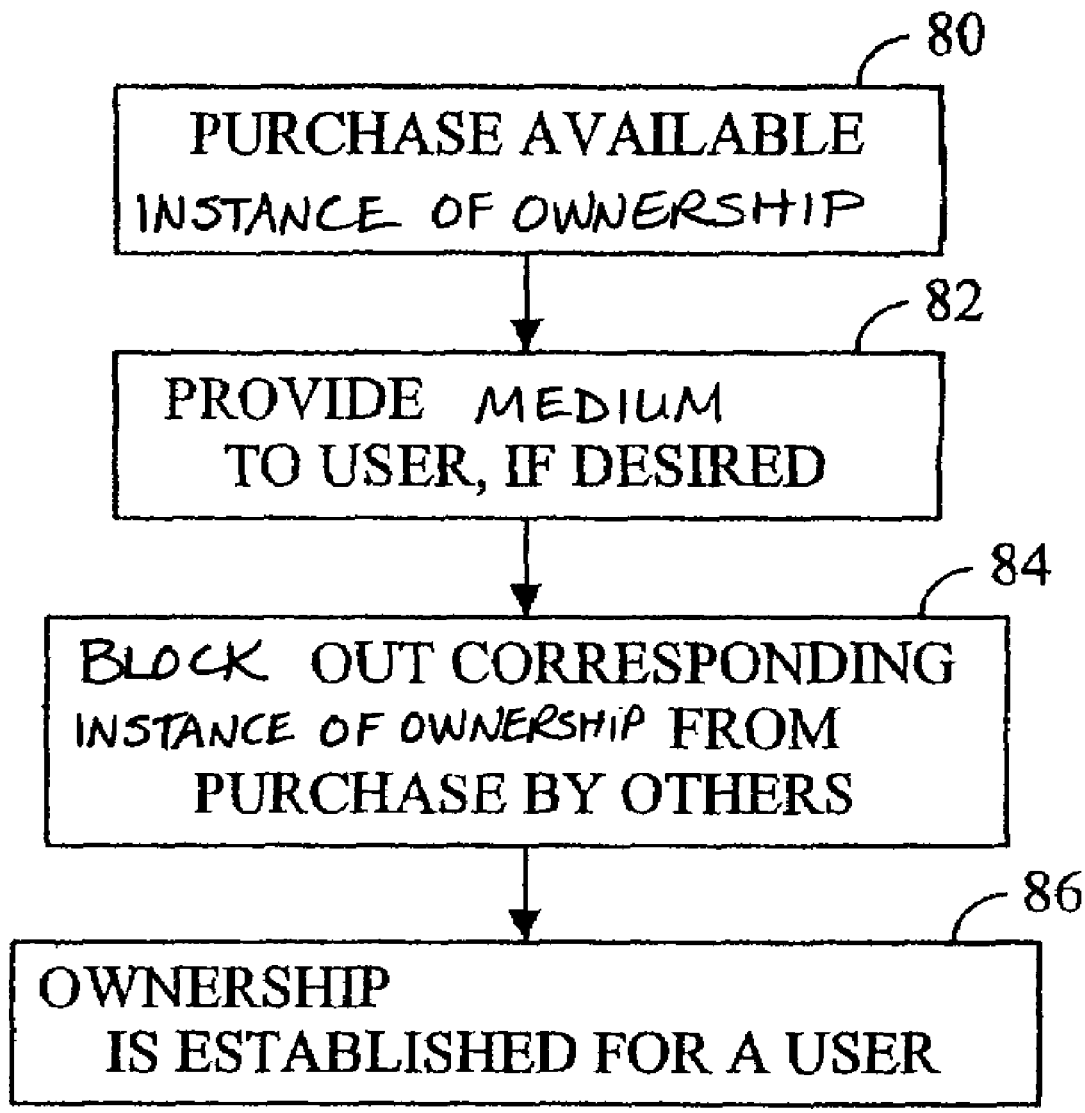
FIG. 5 is a block diagram of another embodiment of an audio file system.

Referring to FIG. 5, the system may include a membership or fee based subscription service. Prior to signing into the server at block 40 (see FIG. 2), the user purchases an instance of ownership in an audio unit at block 80, such as for example, purchasing a compact disk from the service provider or another source. The purchase price may include for example, the retail price of a compact disk, and an account setup fee. In this manner, an instance of ownership rights in a particular audio unit is attributed to a particular user, while the service provider may maintain physical control over any corresponding physical medium on behalf of the user. Since the transaction may be considered a sale or otherwise a purchase, the system may provide the option for providing the compact disk or other media to the user at block 82. In this manner, the compact disk is available to the user, if desired. If the medium is stored by the service provider, then the corresponding instance of ownership is "locked out" or otherwise made unavailable for purchase by another user at block 84. Accordingly, an instance of ownership is established for a user at block 86 by a purchase of a compact disk or other medium or in any other manner. For example, an instance of a license may be obtained without the purchase of the compact disk or a compact disk, digital file, digital rights, or otherwise may be provided to the service provider to establish ownership rights in the content. A compact disk or other medium may be inserted into a computer to establish the ownership of the installed medium.

Figure 6:
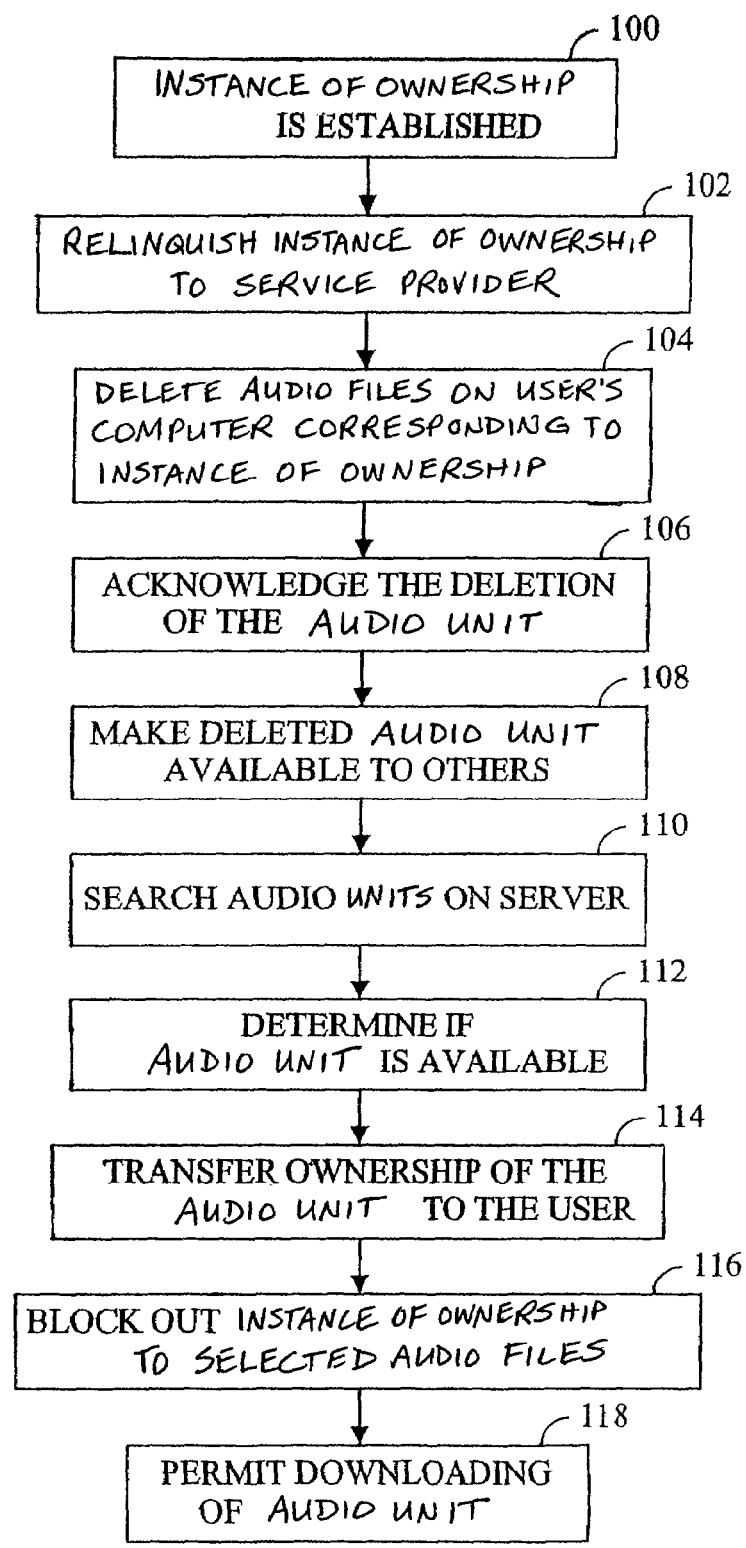
FIG. 6 is a block diagram of another embodiment of an audio file system.

Referring to FIG. 6, the user's ownership of an audio unit is established in any manner at block 100. The user may relinquish the ownership interest to the service provider at block 102. This relinquishment may be performed, for example, by selling a compact disk or other instance of ownership back to the service provider 102 and crediting the user's account. In the case of digital audio files and the desire to fully transfer effective ownership to those audio files and a corresponding medium, if any, the user preferably deletes the audio files corresponding to the relinquished instance of ownership at block 104. The user may acknowledge the deletion of the audio files at block 106. It is to be understood that any other technique may be used to effectuate the "deletion" of a file, such as for example, using technology that results in the file being non-functional after an event such as listening to the file or an elapse of a period of time, removing the header portion from the file, or encoding the file so that it is no longer usable. The service provider may then make the audio unit(s), corresponding to the deleted audio files, acknowledged if desired, available to other users at block 108. The user may search the audio files on the server 110 to locate desirable audio files. The system determines if the corresponding audio unit is available by determining the availability of an instance of ownership to the audio unit at block 112. If the audio unit is available at block 112 a transaction transferring the ownership interest in the content between the user and the system is performed at block 114. The transference of ownership may be performed, for examples, by charging the user's account to pay for the compact disk, other medium, license or other instance of ownership or by exchanging a previously owned compact disk or other instance of ownership, as established at 100, for an instance of ownership to the selected audio unit at block 112. In essence, the system effectuates a transfer of the ownership interest in an audio unit from the service provider 102 to the user or from one user to another user. This transfer is preferably not in the nature of a rental, a lease, lending, or by any other act or practice in the nature of rental, lease, or lending. In that way an effective transfer of ownership, or otherwise a sale, of the content is accomplished at block 114. The corresponding instance of ownership for the selected audio unit is blocked out at block 116. With the effective transfer at block 114 and the blocking out of the instance of ownership at block 116, the download of the song(s)/album/or other audio content may be effectively performed at block 118, without impinging on any prohibition against a transfer that is in the nature of a rental, a lease, lending, or the like which may be prohibited under the Copyright Act, 2001. After downloading the audio unit at block 118, the audio files may be exchanged again, in any manner, as desired.

In the preferred embodiment, the user is permitted to download audio files 22 originating from a single audio unit, for which a corresponding instance of ownership is "locked out" to prevent the audio unit from being provided to another user. If the user desires to simultaneously download or otherwise maintain copies of audio files from multiple audio units then the service provider would "lock out" multiple instances of ownership, for example, one or more compact disks or instances of licenses that collectively contain or govern all of the audio files that are currently selected, downloaded, or being downloaded by the user. In this manner, the content provider's rights in this content are protected from unauthorized downloading or other appropriation without proper compensation.

It is to be understood that the user may purchase or otherwise establish multiple instances of ownership, if desired. In that manner, the user does not need to delete all of the downloaded audio files, but only the portion corresponding to the instance(s) of ownership that the user is transferring back to the service provider or to another user. This permits the user more flexibility in the selection of audio content without deletion of any files that has been lawfully obtained.

The digital audio content may be provided to the user in any suitable format desired. For example, some of the existing file formats include, MP3, Liquid Audio, Real Player, MPEG 1, MPEG 2, and WAV (WAVEform audio)

files. In addition, the digital audio content may be provided as "streaming" media which is listened to as the media is being provided to the user.

Figures 7, 8:
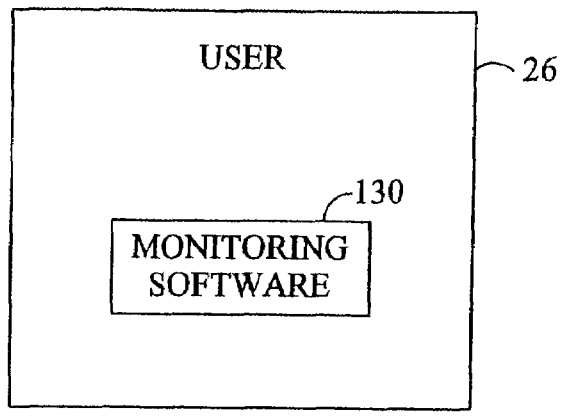
FIG. 7 is a block diagram of monitoring software for use with the audio file system.
FIG. 8 is a block diagram of exchange limitations for use with the audio file system.

Referring to FIG. 7, the system may include monitoring software 130 installed, otherwise operating on the user's computer 26, or available to the user through a networked connection, to assist in the selection of suitable audio. The monitoring software 130 may include an interface that permits the searching for and selection of songs by artist, genre, lyrics, year, decade, title of album, title of song, or any other suitable search criteria. If desired, the monitoring software 130 may track the downloading of audio files from the server 20 and where the corresponding audio files are stored by the user. Thereafter, when the user desires to download additional audio files governed by other instances of ownership, the system may automatically delete the previously downloaded audio content so that the corresponding instances of ownership may be made available to other users.

The exchange of audio files using the server or otherwise may be further limited or otherwise modified by other criteria. Referring to FIG. 8, the criteria may include a limited time during which the user is permitted to listen to the audio content at block 150. In this manner, the purchase, transfer of the ownership, or otherwise will only be valid for a limited time duration, such as 2 hours. This likewise permits the service provider to maintain a smaller collection of instances of ownership because the corresponding audio content is not "checked out" to a particular user for an extended period of time. The time limitation may be based upon, the user's voluntary agreement to delete the songs after a time duration, the monitoring software 130 deleting the songs, a time indication provided with the audio file indicating the time during which the file may listened to and other times the file being rendered inoperable, or any other suitable technique.

To enhance the user's experience, for example where a time limit is imposed on life of the transferred interest, instructions can be provided to the server 20 or other computing device(s) to make one or more audio files requested by the user available at a time specified by the user. If the user requests the availability of an audio file at a particular time, the server 20 or other computing device supplying the audio file can establish and reserve an instance of ownership of the appropriate audio file in anticipation of streaming the file to the user at the specified time. On the other hand, the server may establish and reserve an instance of ownership for the appropriate files and download the audio files to a user's computing device, for example, a set top box, with a time stamp that makes the files available to the user at the specified time. As a result, the audio files are immediately available to the user when the user expects to be available to listen to them.

It may be observed that this system of exchanging or otherwise transferring ownership rights to digital audio files, results in a system that permits users to listen to a wide selection of songs and other audio content. In this manner, the system may be free from the necessity to purchase or otherwise obtain licenses from the copyright holders apart from the license that comes with the purchase of the media.

The criteria may include a comparison between the value of a corresponding compact disk or other instance of ownership currently purchased or otherwise attributed to the user and the value of the compact disk or instance of ownership corresponding to the audio unit that the user desires, at block 152. This permits the system provider to avoid situations in which the user purchases a relatively inexpensive instance of ownership and exchanges that instance for a relatively expensive instance of ownership, thereby depriving the service provider or another user of adequate compensation. For example, a user may purchase a relatively inexpensive compact disk or license and attempt to exchange the compact for a more expensive compact disk or a more expensive license. Likewise, if the user purchases a relatively expensive instance of ownership and exchanges that instance of ownership for a relatively inexpensive instance of ownership, the user's account may be credited or the user reimbursed in some suitable manner.

The criteria may include limitations based on the sign up fee paid by the user. In general, if the user pays a relatively higher fee at block 154 different or more extensive selections of audio units and greater flexibility may be afforded the user.

The criteria may include limitations based upon the type of the media at block 156, such as for example, analog tape, 8-track, laser disc, compact disk, album, super audio compact disk, digital audio disc, etc. In this manner, the system may compensate for the expense of purchasing the corresponding media, with compact disks tending to be more expensive than tapes. In one example, the trading for some users may be limited to audio tapes.

The criteria may include the genre of the music being listened to at block 158. The popular music in some genres, such a rock, tend to be transitory in nature so that the album is in high demand for a limited period of time therefore resulting in the service provider purchasing of many copies of the corresponding media. However, after a limited period of time, the album will tend to be relatively unpopular after which the service provider will have a large collection of corresponding media without any corresponding demand. After this occurrence, the service provider may sell the corresponding media at a considerable loss. In contrast, genres that have a stable demand will not result in such temporary over purchasing of corresponding media and therefore will tend to be less expensive for the service provider.

The criteria may include user preferences at block 160 by which the user selects exchange and usage limitations. The user preferences may be used as the basis for determining the fee criteria for the exchanging of audio files or otherwise.

The criteria may include the length of the audio files, number of audio files exchanged, downloaded, or otherwise transferred or the number of audio units on a particular compact disk(s) or subject to another instance of ownership at block 162. Similarly, this criteria may permit the service provider to adjust the fee schedule based upon the bandwidth for file transfer that the user will be using to download the audio files.

The criteria may also include geographical limitations relative to the distribution the audio unit and the compensation of audio suppliers at block 163. The system may determine if an instance of ownership of an audio unit is available at the location of the user 26, 28, 30, 32 before enabling downloading of the corresponding audio files 22.

Figure 9A:
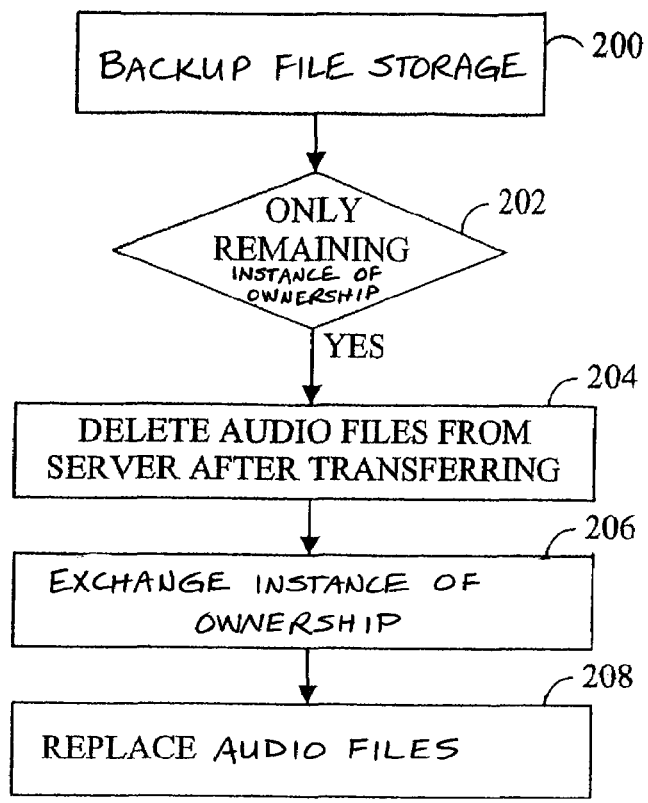
FIG. 9A is a block diagram of a further embodiment of an audio file system.

The present inventors determined that there may be copyright considerations relating to maintaining a backup copy of an audio file, such as an MP3 file, on the server 20, after transferring a copy of the audio file and a last corresponding instance of ownership to a user. Referring to FIG. 9A, the service provider may store one or more of the compact disks in a compact disk jukebox or other system that makes a physical medium containing an audio file available on demand 200. In the event that the downloading of an audio file represents the only remaining copy of the corresponding compact disk or instance of ownership owned by the service provider (block 202), then the service provider may delete the audio file 22 from the server 20 after transferring the audio file to the user at block 204. In this manner, only one single copy of the audio file, corresponding to a single compact disk or instance of ownership, and possibly a backup of that audio file will be maintained. After the user exchanges the compact disk or other instance of ownership at block 206 the digital audio files may be "ripped" from a compact disk at block 208 to the server or possibly retrieved from a backup copy or other source to replace the audio files previously deleted from the server 20. In addition, the user could likewise retransfer the audio files back to the server, if desired. However, for each audio unit where the service provider has an instance of ownership, the service provider may only need to "rip" or otherwise store one set of audio files 22, which could result in substantial time and cost savings. Moreover, with the "ripping" of the digital audio files being performed by the service provider the quality and completeness of the audio files 22 may be maintained.

Figure 9B:
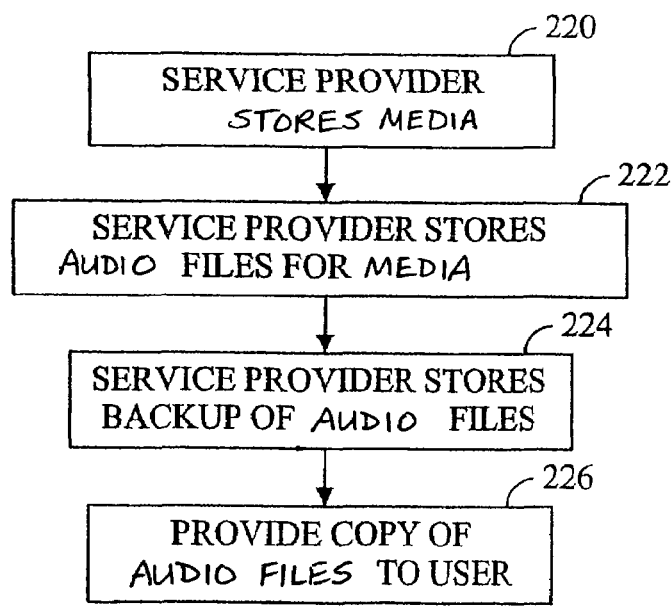
FIG. 9B is a block diagram of a further embodiment of an audio file system.

Referring to FIG. 9B, the service provider stores or otherwise has ownership rights in an assortment of compact disks or audio units stored on other media at block 220. The service provider likewise may store audio files 22 corresponding to the content included in the media at block 222. Further, the service provider 220 may likewise have internal backups of the audio files at block 224. The user may download the digital audio files from the provider at block 226. In the event that an insufficient number of a particular compact disk is not "locked out" or otherwise available to other users, such as the last copy of the compact disk is provided to a user at block 226, then the service provider may be considered to be storing a backup copy of the digital audio files on the server 20 on behalf of the user. In this manner, when the user exchanges the particular storage medium or instance of ownership the server 20 may use the previously stored backup of the digital audio files for other users. Accordingly, the system may permit the last compact disk to be "locked out" while retaining a backup copy of the audio files on the server 20 to alleviate the need to "rip" another set of audio files 22 from the storage medium.

Figure 10:
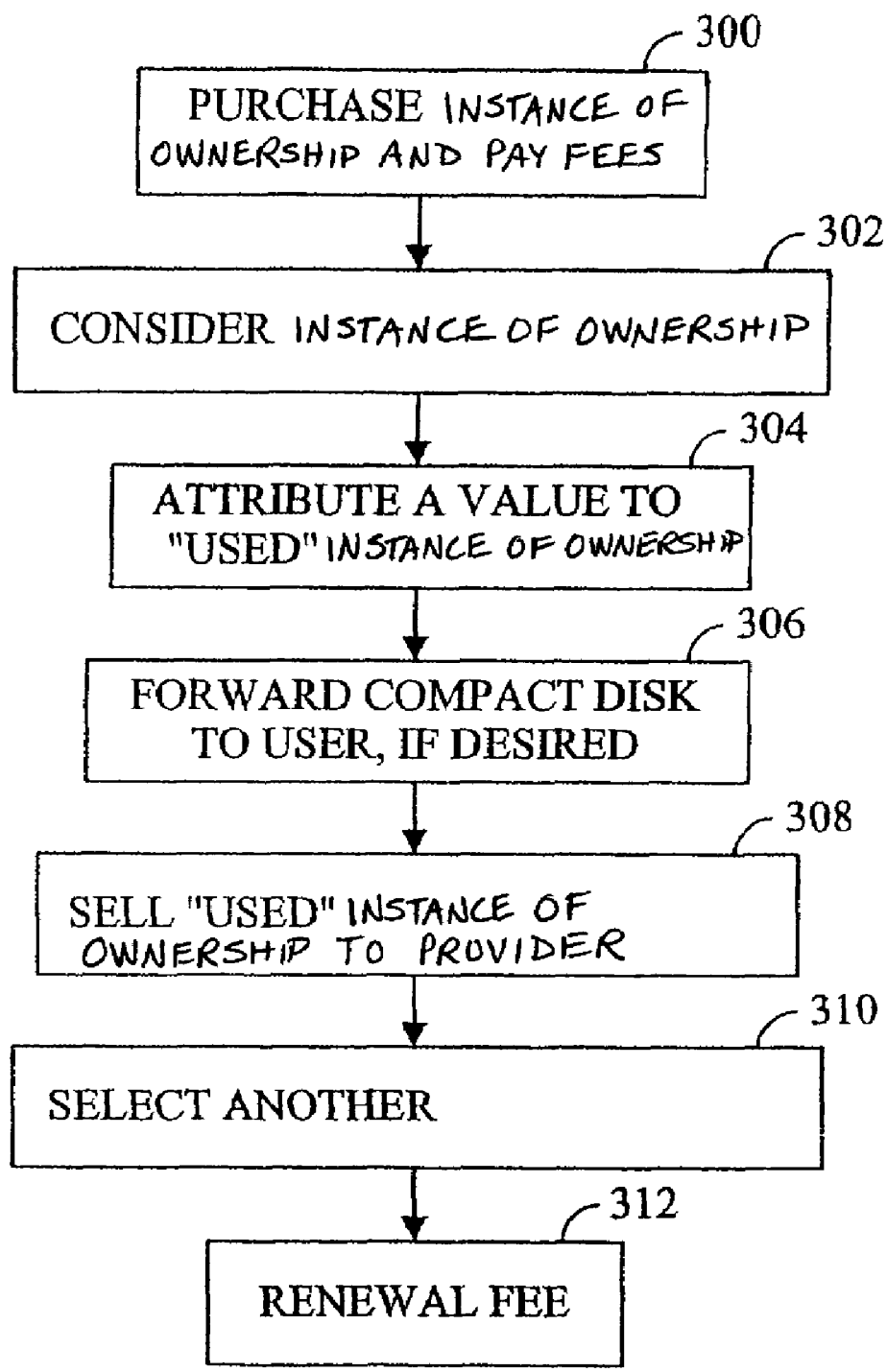
FIG. 10 is a block diagram of a further embodiment of an audio file system.

Referring to FIG. 10, the audio distribution service provider may provide an annual or other periodic subscription model for operating the service business. For example, the user may initially purchase a compact disk, other medium or other instance of ownership, and pay an account setup fee and/or renewal fee at block 300 and/or other fees. The purchase of the instance of ownership may be at a retail price of a compact disk, for example, or other suitable price. The fee for acquiring the instance of ownership may likewise vary based on the price of a compact disk including the selected audio unit or other price of the audio unit selected. The account setup fee may be, for example, a one time fee for creating an account on the system. The renewal fee may be a periodic fee, such as monthly, quarterly, annually, etc., for access or otherwise using the system. After a period of time, such as an annual time, the system may consider the purchased instance of ownership as a "used" instance of ownership, even though the instance of ownership may comprise a license or a physical medium that may not have been actually removed from its packaging and used in the traditional sense at block 302. The instance of ownership assigned a "used" value may be a compact disk the user has exchanged, a compact disk or other medium purchased when setting up the account, or otherwise any suitable disk or media right. A value may be attributed to the "used" compact disk at block 304. The user may have the option of having the "used" compact disk or other storage medium forwarded, with the addition of shipping and handling charges, if desired at block 306. If the user does not desire to have a storage medium forwarded, such as at the end of a renewal period, then the "used" value of the storage medium or other instance of ownership may be credited to the user's account by selling the compact disk or instance of ownership to the service provider or another user at block 308. The user may then select another compact disk for the next period of time, such as an annual time, at block 310. The service provider may charge the user a fee for the renewal, which may include for example, a renewal fee and the price of the new disc minus the "value" of the "used" compact disk, at block 312. In this manner, the user has the option of selling the "used" compact disk, if desired. In addition, the user may have the option of crediting the sale of the "used" compact disk toward the purchase of a new compact disk for the next time period. In other words, this effectuates a sale of the storage medium or other instance of ownership and likewise permits the user to purchase another compact disk or instance of ownership from the service provider or another user.

Figure 11:
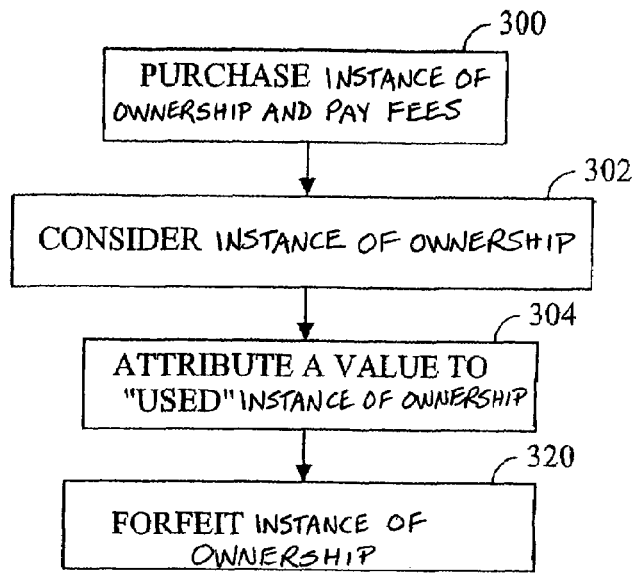
FIG. 11 is a block diagram of a further embodiment of an audio file system.

Referring to FIG. 11, another option for termination of the annual subscription is to provide for forfeiture of the compact disk or other instance of ownership. The forfeiture may be automatic, in the event that the user can not be contacted, or in the event that the user does not renew or otherwise agree to pay for the shipping and handling. In this manner, the storage medium or other indicia of an instance of ownership may become property of the service provider and the agreement with the user will be terminated.

Figure 12:
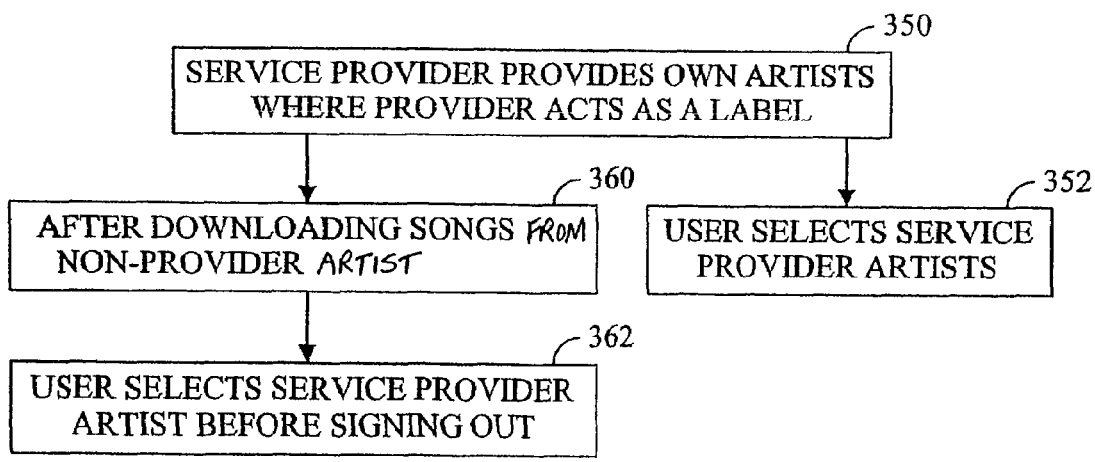
FIG. 12 is a block diagram of a further embodiment of an audio file system.

Referring to FIG. 12, the service provider may sign up its own artists and act in the capacity of a record label itself. In this manner, the service provider may be the owner of all of the copyright-rights in the music, to the extent possible under current Copyright Laws of the particular jurisdiction. The service provider artists may likewise include artists where the service provider is alleviated from having to pay the normal royalties owed the copyright owners if the music was provided in a typical manner, such as by radio or other broadcast. In general, the artists provided by the service provider will incur less royalties than would have normally otherwise because of contractual relationships with the artists or other copyright holders. The service provider may provide the option to users of sampling its own artists at block 350. The user may select one of the service provider artists at block 352. The user may, after downloading (e.g., purchasing) an audio unit produced by non-service provider artists at block 360, elect to exchange the currently downloaded audio files for one of the service provider artists at block 350 before signing off the service. In this manner, the time between uses of the system by the user during which the user may be "parked" on expensive compact disks or other expensive audio files is minimized. This may reduce the expense of the available digital files for the service provider. This frees up additional audio files for other users and reduces the inventory required by the service provider to provide a full selection.

The preferred embodiments envision that the audio files may be transferred by some type of file transfer or streaming media. The system may use streaming audio content where instead of transferring digital audio files the audio content is streamed in a continuous fashion to the user's computer, while the user simultaneously listens to the content as it is being streamed or otherwise listens to the content at later time. Moreover, the server 20 may simultaneously stream and download the file to the user. In addition, the audio files may be provided to the user in a manner that requires modification of the audio file after downloading prior to listening to the file. In this manner, the distribution of the audio files may be more readily controlled, if desired. If desired, the audio files may be directly provided via an e-mail or likewise to the user or otherwise made available for downloading from the server. The server may make the audio files available in an "in box" or other user account that resides on the server. In this manner, the audio files are made available and the user may selectively download the desirable audio files. After the audio files are exchanged, transferred, sold, or otherwise relinquished or transfer ownership thereof, the server may simply remove access to the audio files from the user's "in box" or the user's account.

Figure 13:
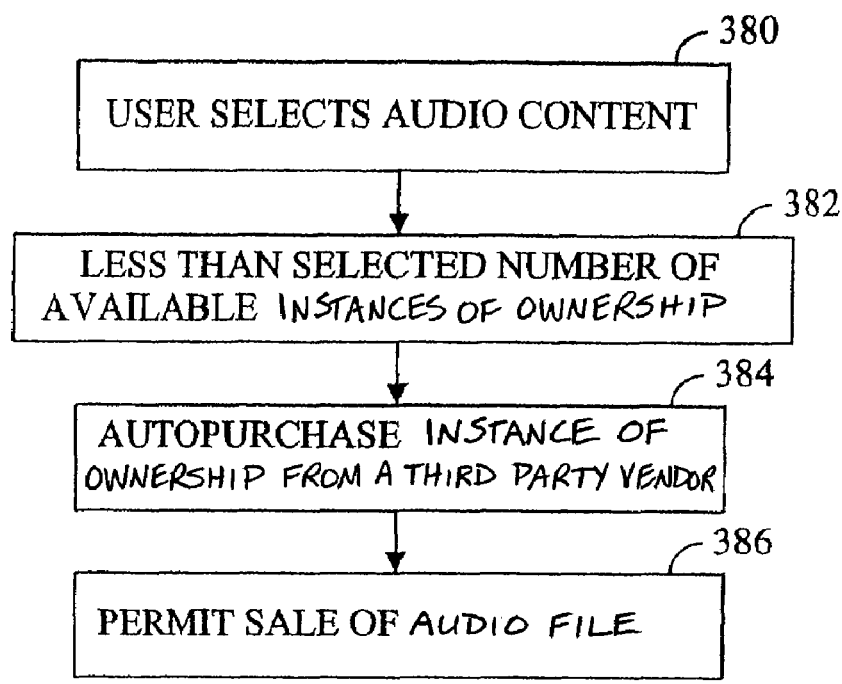
FIG. 13 is a block diagram of a further embodiment of an audio file system.

Referring to FIG. 13, the user may select audio content at block 380. If the system determines that less than a selected number of instances of ownership are available, such as zero, one, two, etc., then the system at block 382 may desire to obtain additional copies or otherwise rights to more audio files. While ordering additional compact disks or instances of ownership through the mail is possible, it is prohibitively time consuming when a customer desires the audio files at that time. To overcome this limitation, a computer networked based automatic purchasing agent may be used to purchase an additional compact disk or other instance of ownership at block 384. In the event that there were no additional copies or other rights to audio files available from the server (or less than the desired number), the audio files are permitted to be downloaded or otherwise purchased at block 386 after the automated purchasing agent has secured the rights to additional copies of the compact disks or instances of ownership rights.

The system may track the exchange of audio files for particular users. In this manner valuable statistical data is obtained that may be used for any suitable purpose, including the selection of additional audio files. The data may include, for example, popularity of particular compact disks, popularity of particular songs on particular compact disks, popularity of songs/compact disks as a function of the time of day, groups of albums that are likely desirable by the same user by monitoring user's exchanges, popularity of songs/compact disks as a function of the region of the country, popularity of songs/compact disks as a function of the age of the user, popularity of songs/compact disks as a function of the sex of the user, popularity of songs/compact disks as a function of the demographics of the user, popularity of songs/compact disks as a function of the income of the user, popularity of songs/compact disks as a function of the duration the audio files were purchased by the user, popularity of songs/compact disks as a function of whether the corresponding compact disk or single was purchased, popularity of songs/compact disks as a function of the artist, popularity of songs/compact disks as a function of the genre, popularity of songs/compact disks as a function of the year, popularity of songs/compact disks as a function of the decade/year the compact disk was released, and popularity of songs/compact disks as a function of the decade/year the compact disk was recorded.

Figure 14:
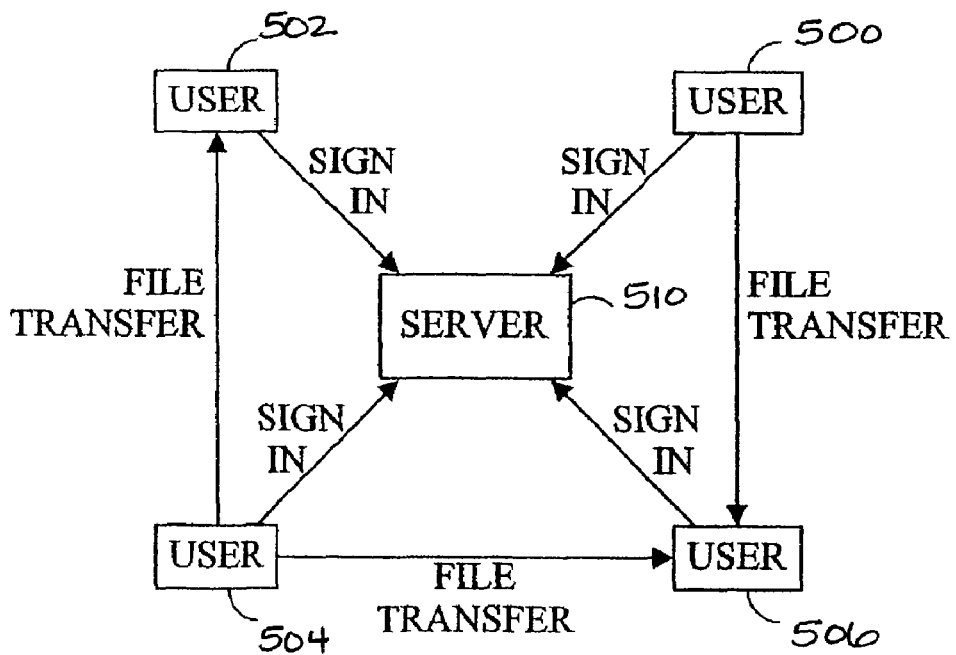
FIG. 14 is a block diagram of a further embodiment of an audio file system.

Referring to FIG. 14, in another embodiment the system may be used in a peer-to-peer environment where different users 500, 502, 504, and 506 sign into the server 510. The users preferably provide a list of available audio files to the server 510 or to all, or a selected set of, the other users which can be exchanged with other users. The users may then search the server to locate other users that have desirable audio files for downloading from the other user. In this manner the server 510 acts as a clearing house for available audio files for transfer between users. In addition, the server 510 likewise preferably tracks the identity of the files in which each of the users has ownership rights. The server 510 may then be used as a tracker to identify other computers having audio files containing a portion of an audio unit and cause the audio unit to be downloaded from files included on several storage devices. In addition, the sever 510 may be implemented in the manner of a distributed server residing on one or more of the users' computers. When a user desires to obtain ownership rights to another compact disk or otherwise, the server 510 or otherwise the distributed server "locks" out a corresponding compact disk or otherwise makes available audio ownership rights for the user transferring a copy of the audio files from the other user. In this manner, the server 510 acts as an ownership clearing house for the audio ownership rights. In a similar manner, user's may transfer ownership rights of audio files back to the server 510, or others users, and obtain new audio files from other users, while the server 510 or other user provides the user downloading the file with the proper ownership rights to the media. In this manner, the server 510 (or other users) acts as a clearing house for audio files while the actual files are being transferred from other users, as opposed to the server itself.

Figure 15:
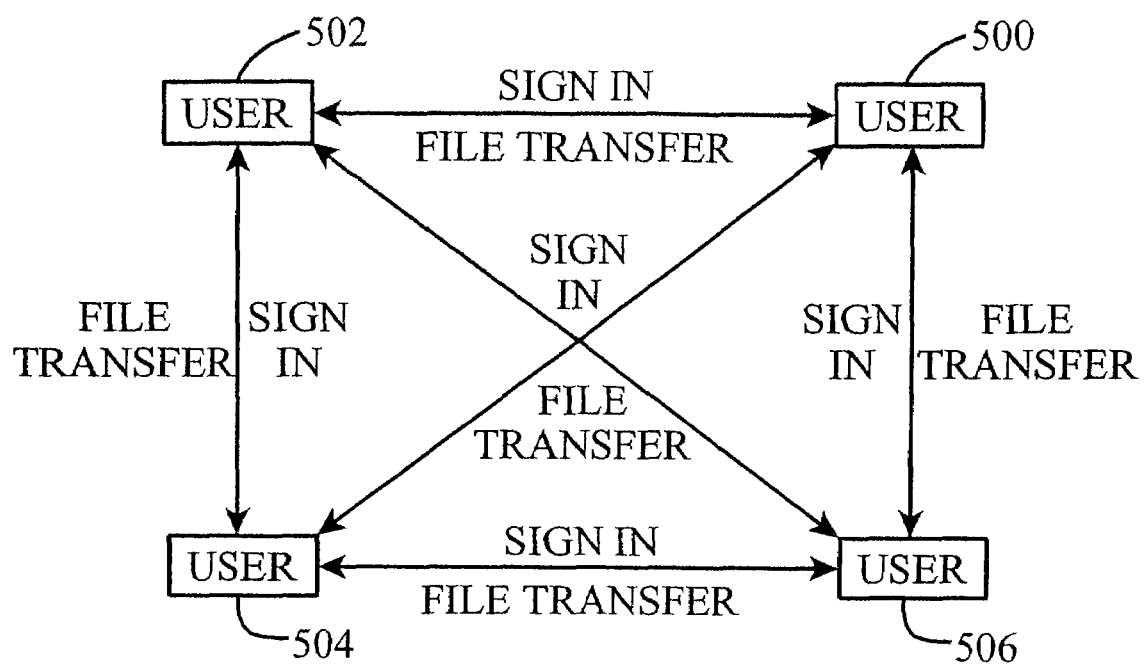
FIG. 15 is a block diagram of a further embodiment of an audio file system.
Figure 16:
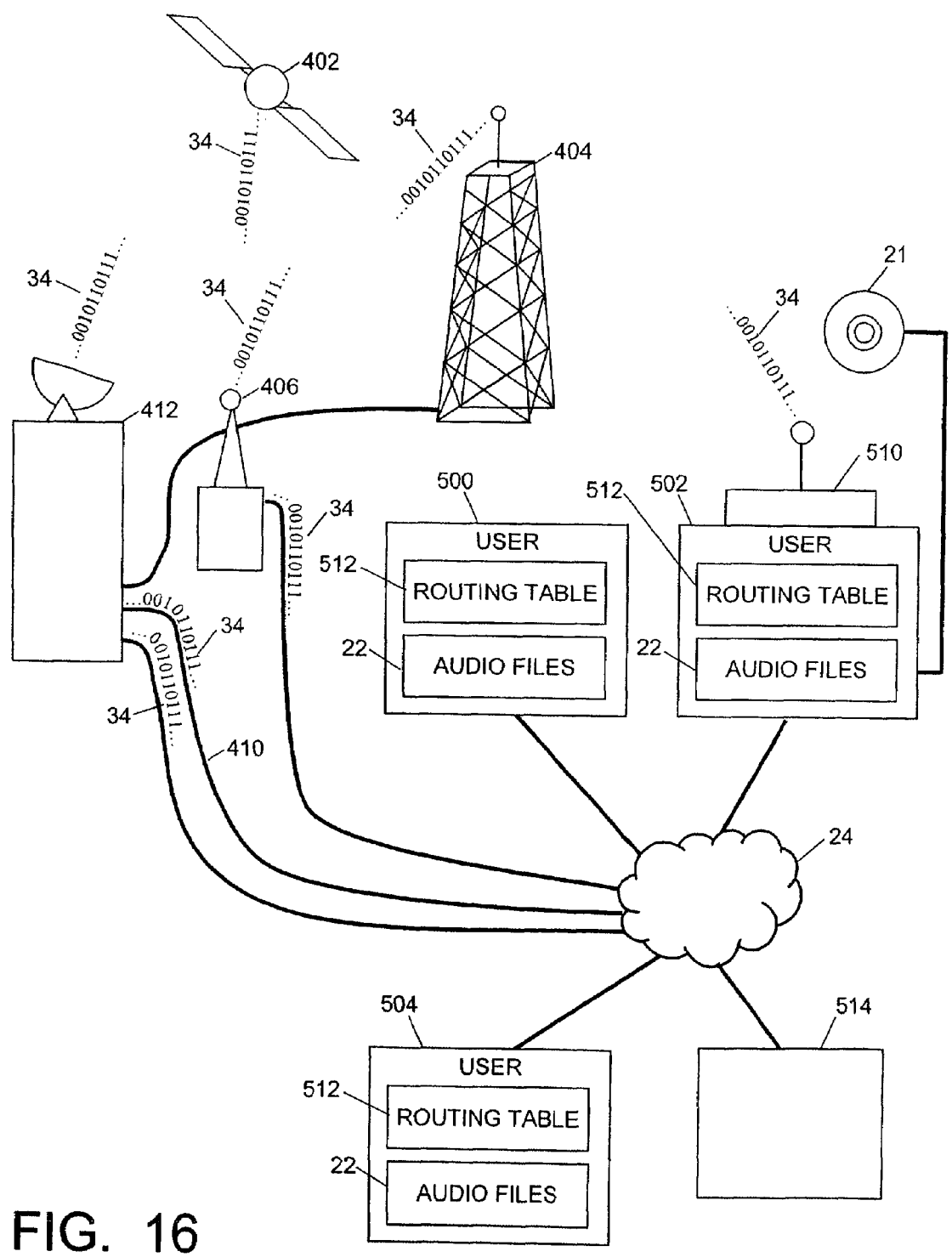
FIG. 16 is a picotrial diagram of another network-based audio file system.

The audio distribution system may be extended to eliminate the server and enable the users to perform the exchange between themselves. Referring to FIGS. 15 and 16, each user computing device 500, 502, 504, 506 provides bi-directional communication with at least one computing device of another user. The user computing devices may comprise, for examples a personal computer, a set top box, or a combination of a personal computer and a set top box. The user computing devices also include a hard disk, CD or DVD magazine or other storage media for storing audio files 22 and other data files. The audio files may be obtained from a number of sources, including a compact disk, record, tape or other storage medium 21. In addition, audio files may be obtained by sampling analog audio signals or by electronic file transfer from a file source or by capturing a digital data stream 34. The digital data streams may comprise; by way of examples, digital radio, television, Internet and other digital transmissions. The transmissions may be over-the-air transmissions from a satellite 402 or terrestrial radio or television transmitter 404 and received by a digital radio or television receiver 510 that is part of or in communication with a respective user computing device. The user computing device enables time shifting of data streams, such as radio and television transmissions, so that the stream content can be listened to at a time that is convenient to the user.

Each user computing device makes a local collection of audio files 21 available to the network of computing devices for reading and writing. In addition to the audio files, the computing devices of the network include a routing table 512 containing addresses of other computing devices and identifications of the audio files that are believed to be available from the respective devices. Knowledge of the audio files available from other computing devices of the network may be obtained from a compilation of audio file identities provided by the user and transmitted to other computing devices in the network or by a spider that periodically reads the identities of available audio files posted by each networked device or by another means.

When a user requests an audio file from the user's computing device, the computing device attempts to locate the file in its local storage. If unable to find the audio file locally, the computing device transmits a message to the nearest computing device believed to maintain a copy of the requested file for downloading. When that device receives the request, it retrieves the audio file from its data storage and transmits the file to the requester and updates its routing table. If the device receiving the request is unable to find a copy of the requested audio file in its data storage, it forwards the request to its nearest neighbor believed to hold the audio file. The process continues until the file is located and transmitted to the original requester or until a predetermined number of hops, sequential requests for the file, has occurred without locating the requested file. The computing device providing the audio file preferably deletes a copy of the transferred file after the transfer. Alternatively, a user may store the compact disk or indicia of an instance of ownership on behalf of the user obtaining the digital audio files. In this manner, the users are able to identify themselves to each other and transfer the audio files between themselves while providing a compact disk or other indicia of an instance of ownership to the transferee.

The audio distribution system may also include an administrative computing device 514 which may be operated by a service provider or distributed among the computing devices of users. The administrative computing device acts as a clearing house to enable access to audio content by users. A user seeking to own an audio file can direct the respective user computing device to contact the administrative computing device and obtain permission to obtain a copy of an audio file. The administrative computing device verifies, with audio content providers, the identity of the user as a subscriber at the time when the audio content is available. The administrative computing device would contact the computing devices of the subscribing user and grant a permission enabling copying of the audio file on the user's computing device. The set top box or other user computing device would notify the administrative computing device existence of the audio file. In addition, if ownership rights in the audio file were transferred to another user the transferor's computing device would notify the administrative computing device of the transfer. In this manner, the administrative computing device 514 (or other users) acts as a clearing house for audio files while the actual files are being transferred between users without the intervention of a server.

In addition to audio files, the system may be used to transfer other types of digital files. Such digital files may include digital video content, computer software, or any other type of digital content.

The user may likewise purchase a compact disk from the service provider which is shipped to the user, and the corresponding digital audio files are provided to the user with the compact disk or otherwise provided to the user through a computer network.

Referring in detail to the drawings where similar parts of the invention are identified by like reference numerals, The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of distributing audio comprising the steps of:
   (a) storing at least one audio compilation on a server arranged to communicate with another computing device, each said audio compilation associated with a respective ownership license to a first number of instances of the totality of said audio compilation, each audio compilation comprising individual audio tracks selectively, separately transferable over a communications channel to and from said server;
   (b) assigning a respective second number of instances of ownership of each said track, said second number equal to the sum of the number of individual audio compilations to which the respective said track belongs, each multiplied by the said first number of instances associated with the respective said individual audio compilation included in said sum;
   (c) identifying a said audio track selected for purchase by a third party by download to said another computing device;
   (d) determining the availability of an instance of ownership of said audio track;
   (e) transferring a copy of said track to said other computing device if at least one instance of ownership of said audio track is available, and thereafter incrementing the said second number of instances of ownership of said audio track downward by one; and
   (f) preventing transfer of a copy of said audio file if no instance of ownership of said audio unit is available.

2. The method of distributing audio of claim 1 wherein the step of storing data included a data stream in at least one audio track on a server arranged to communicate with another computing device comprises the steps of:
   (a) receiving a transmission comprising said data stream;
   (b) recording said transmission; and
   (c) storing said recorded transmission in at least one audio file.

3. The method of distributing audio of claim 1 wherein said transmission comprises a radio transmission.

4. The method of distributing audio of claim 1 wherein said transmission comprises a satellite radio transmission.

5. The method of distributing audio of claim 1 wherein said transmission comprises a television transmission.

6. The method of audio of claim 2 wherein the step of storing said recorded transmission in at least one audio track comprises the steps of:
   (a) identifying at least one audio unit included in said data stream; and
   (b) storing said audio track in at least one audio file.

7. The method of distributing audio of claim 1 wherein the step of transferring a copy of an audio file to another computing device if at least one instance of ownership of the audio unit is available comprises the steps of:
   (a) tracking an identification and a location of said audio file;
   (b) constructing a pointer file indicating said identification and said location of said audio file; and
   (c) communicating said pointer file to a computing device arranged to download said audio file.

8. The method of distributing audio of claim 1 further comprising the steps of:
   (a) accepting return of an instance of ownership for a previously transferred audio unit; and
   (b) making available an instance of ownership to enable a subsequent transfer of an audio file comprising an audio unit corresponding to said returned instance of ownership.

9. The method of distributing audio of claim 8 further comprising the step of requesting acknowledgement of deletion of an audio file comprising said previously transferred audio unit.

* * * * *

UNITED STATES PATENT AND TRADEMARK OFFICE
CERTIFICATE OF CORRECTION

| | | |
|---|---|---|
| PATENT NO. | : 7,370,063 B2 | Page 1 of 1 |
| APPLICATION NO. | : 11/355380 | |
| DATED | : May 6, 2008 | |
| INVENTOR(S) | : Andy Vilcauskas and Bryan Hunter | |

It is certified that error appears in the above-identified patent and that said Letters Patent is hereby corrected as shown below:

In the Specification

Col. 5, Line 24

Change "can uploaded" to read --can be uploaded--.

Col. 10, Line 27

Change "such a rock" to read --such as rock--.

Col. 14, Line 6

Change "the sever 510" to read --the server 510--;

Col. 14, Lines 14-15

Change "manner, user's may" to read --manner, users may--;

Col. 14, Line 16

Change "or others users" to read --or other users--.

Col. 15, Lines 28-29

Change "device existence" to read --device of existence--;

Col. 15, Lines 47-48

Change "numerals, The" to read --numerals. The--.

In the Claims

Col. 16, Line 24

Change "audio unit" to read --audio track--.

Signed and Sealed this
Twenty-second Day of October, 2013

Teresa Stanek Rea
*Deputy Director of the United States Patent and Trademark Office*